R. H. SLEICHER.
BALL CASTER.
APPLICATION FILED JAN. 30, 1915.

1,154,448.

Patented Sept. 21, 1915.

Witnesses
Ed. R. Lusby
M. E. Moore

Inventor
Ralph H. Sleicher
By David P. Moore
Attorney

UNITED STATES PATENT OFFICE.

RALPH HERBERT SLEICHER, OF TROY, NEW YORK, ASSIGNOR TO THE HOSPITAL APPLIANCE COMPANY, OF TROY, NEW YORK, A CORPORATION OF NEW YORK.

BALL-CASTER.

1,154,448.

Specification of Letters Patent.   Patented Sept. 21, 1915.

Application filed January 30, 1915.   Serial No. 5,198.

*To all whom it may concern:*

Be it known that I, RALPH H. SLEICHER, a citizen of the United States, residing at Troy, in the county of Rensselaer and State of New York, have invented certain new and useful Improvements in Ball-Casters, of which the following is a specification, reference being had therein to the accompanying drawing.

The present invention relates to an improved ball caster, one object of the invention being the provision of a caster constructed for use upon hospital couch or spring frames, barn and garage doors, and upon furniture of all kinds and characters, it being especially adapted for use upon structures where the ball is guided in a runway, the caster house shank being mounted in a ball bearing so that in case the housing should impinge or contact the side of the runway the shank can rotate upon its axis and thus permit a noiseless and easy running caster.

A further object of the invention is the provision of a ball caster, which is provided with a ball bearing load carrying ball for contact with the supporting surface, the shank of the ball carrying member being surrounded by a ball bearing which permits the shank to rotate upon its axis, while the ball bearing coöperates with an attaching plate to hold the complete caster in assembled and mounted position.

With the above and other objects in view and which will readily appear as the description proceeds this invention resides in the details set forth and particularly pointed out in the appended claims.

Figure 1:
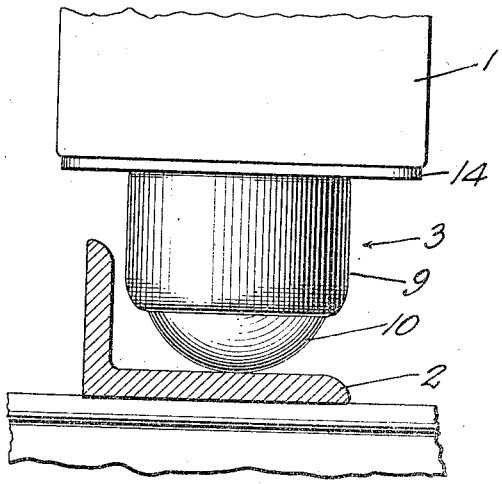
Figure 2:
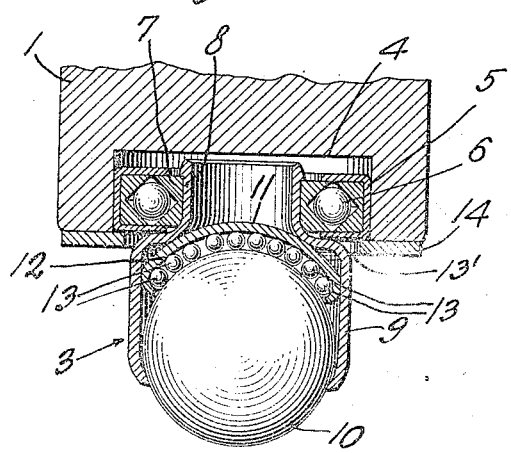
Figure 3:
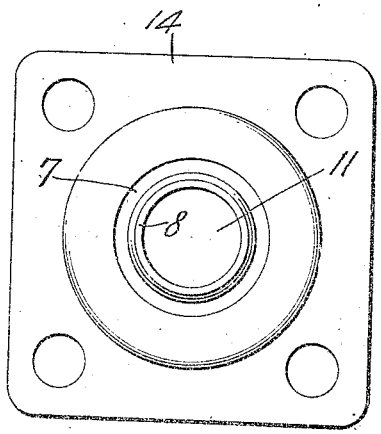

In the accompanying drawings, Figure 1 is a sectional view through one corner of a hospital couch frame showing one use for the present ball caster, which is in assembled position. Fig. 2 is a vertical section through the complete caster. Fig. 3 is a top plan view thereof.

Referring to the drawings, the numeral 1 designates the corner of a couch frame, and 2 the runway for the caster 3.

The corner is provided with an opening or socket 4 into which the casing 5 of the ball bearing 6 fits. The inner sleeve 7 of the ball bearing is fast about the tubular shank 8 of the caster, while the housing 9 for the ball 10, is an enlargement of the shank. Fitted within the upper end of the housing 9 is the cap 11, which provides a casing for the ball bearing 12, the balls 13 of which antifrictionally engage the ball 10 from above and thus permit the ball 10 to rotate freely in its housing when in contact with the runway as shown in Fig. 1.

The casing 5 is of greater diameter than the housing 9, while the opening 13 of the securing plate 14 is of slightly greater diameter than the housing 9 and of lesser diameter than the casing 5, so that when the plate is in the position as shown in Fig. 1 and attached to the corner 1, the caster is supported in place and held against downward displacement. The casing 5 is also held in fixed position, so that the housing 9 when contacting the sides of the runway will rotate freely upon a vertical axis and without any jar upon the couch, this being very essential in a hospital bed.

It will therefore be evident that the ball 10 under most conditions bears the full load and that the least friction possible is the result, while the ball bearing 6, whose center is the vertical axis of the ball 10 permits the housing 9 to rotate freely when required so to do. It is also evident that the plate 14 can be easily placed about the housing and beneath the casing 5 to lock the parts assembled.

This caster though particularly designed for hospital beds, can be used where other casters of a like nature are now employed.

What is claimed, is:—

1. A ball caster, including a tubular shank having an enlarged ball housing, a ball mounted in the housing, a ball bearing surrounding and carried by the shank and having its outer circumference greater than the circumference of the ball housing, and an apertured attaching plate loosely fitting upon the housing and coöperating with the ball bearing to hold the caster against longitudinal movement.

2. A ball caster, including a tubular shank having an enlarged ball housing, a ball mounted in the housing, an inner ball race surrounding and fixed to the shank, an outer ball race of greater diameter than the exterior of the housing, balls between the races, and an apertured attaching plate loosely fitting about the housing and abutting the outer ball race.

In testimony whereof I affix my signature in presence of two witnesses.

RALPH HERBERT SLEICHER.

Witnesses:
J. F. WHELAN,
EULALIA WEBB.